Nov. 11, 1958   E. S. TUPPER   2,859,786
COUPLING MEANS FOR TUBULAR VESSELS
Filed Feb. 21, 1956
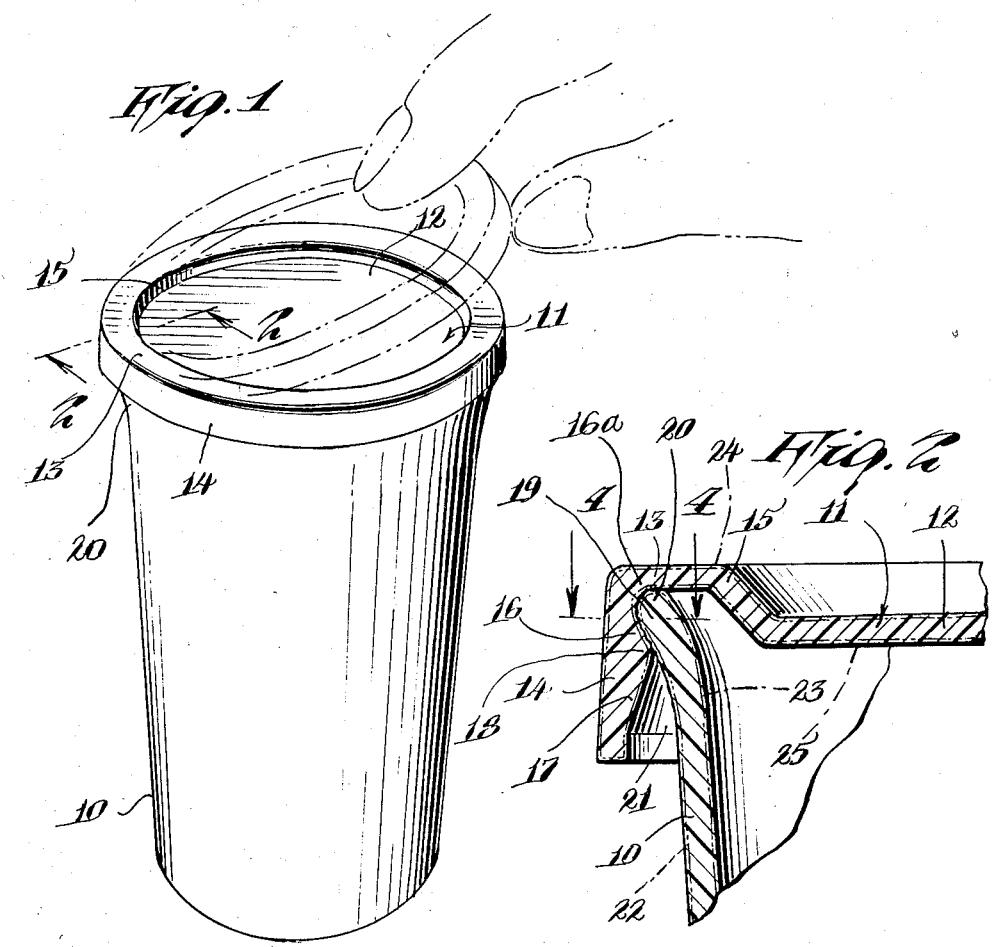
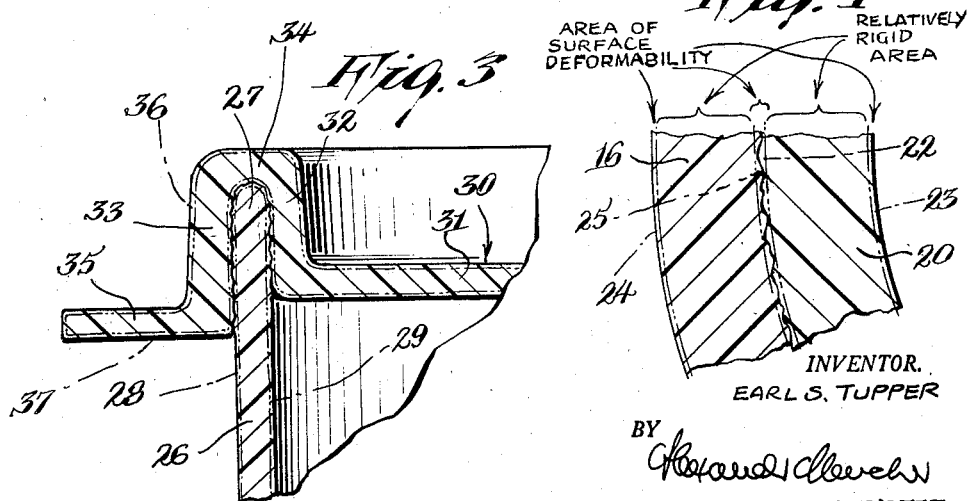
INVENTOR.
EARL S. TUPPER

United States Patent Office 2,859,786
Patented Nov. 11, 1958

2,859,786

COUPLING MEANS FOR TUBULAR VESSELS

Earl S. Tupper, Esmond, R. I., assignor to Tupper Corporation, North Smithfield, R. I., a corporation of Delaware Application February 21, 1956, Serial No. 566,846

7 Claims. (Cl. 150—.5)

This invention relates generally to containers having snap-on types of closures therefor, and wherein hermetical sealing is accomplished by a gasket effect of the plastic material from which the closure is formed.

The main feature of the invention resides in the provision of a snap-on type of closure formed of low-pressure polyethylene and capable of effecting a hermetical sealing joint with the mouth of a container by reason of surface properties of said material in conjunction with the sealing joint structure.

A further object of the invention resides in the provision of a snap-on type of closure applicable to a container made of any desirable material and wherein the closure is relatively inflexible or stiff but wherein the surface layers thereof by virtue of the inherent nature of at least the molded product from said material are resilient and deformable to effect a gasket action at removably engaging portions of the closure and the container.

This invention represents an improvement over applicant's invention in Patent No. 2,487,400 issued November 8, 1949 in that hermetical sealing is accomplished by a surface phenomenon instead of by properties inherent in the full thickness of high-pressure polyethylene.

It is known that high-pressure polyethylene presents properties of local deformability, has a slow rate of recovery, is frictional and waxy to the touch, does not absorb and is not readily wetted by water, is odorless and resistant to acids, alkalis, solvents and other chemicals at ordinary temperatures; will not soften far below the boiling point of water; is resistant to mildews, micro-organisms and insects.

Polyethylene or polymers or copolymers of ethylene under the generic term polyethylene as manufactured under low-pressure processes exhibits physical properties which are different and for certain purposes advantageous to high-pressure polyethylene, such as relative stiffness, less susceptibility to change in form of fabricated products at higher and lower temperatures, increased strength, increased resistance to impact, tear and corrosives, etc.

The invention herein takes advantage of these properties, but in addition utilizes the surface properties of low-pressure polyethylene at least following a molding operation, including softness and waxiness to the touch. It has been found that the physical properties of the opposite surface layers, whether one or both is utilized, is sufficient to have a gasket effect when removably engageable members are involved for hermetical and efficient juncture. In effect, the low-pressure polyethylene material seemingly due to a species of molecular orientation, at least after a molding operation, furnishes its own gasket when articles adapted for removable engagement are fabricated therefrom.

A further object of the invention resides in the provision of hermetical sealing means between engaging members including a container and a cover wherein a hand removable and rigid sealing joint is effected and which includes utilization of low-pressure polyethylene on the whole or portions at contacting sealing areas between the cover and the container or other cooperating articles.

These objects and other incidental ends and advantages of the invention will hereinafter appear in the progress of the disclosure and as pointed out in the claims.

Accompanying this specification is a drawing showing preferred forms of the invention wherein:

Figure 1 is a view in perspective showing the invention as embodied in a container of any desirable shape and a snap-on type of closure engaging the upper edge thereof, the manner of removal being shown in phantom.

Figure 2 is an enlarged fragmentary and sectional view of Figure 1 across the plane 2—2 thereof.

Figure 3 is a view similar to Figure 2 showing a modified form of closure and container showing another type of sealing joint therebetween.

Figure 4 is a fragmentary sectional view of Figure 2 showing the contacting and non-contacting areas of a sealing joint between a closure or cover and a container.

In accordance with the invention and the preferred forms shown, numeral 10 indicates a receptacle of any shape and type adapted to receive a cover. The invention as illustrated contemplates the use of a relatively rigid snap-on type of cover or closure requiring a gasket effect for hermtical sealing; and for this purpose utilizes low-pressure polyethylene which exhibits the physical characteristics of rigidity between the opposite surfaces thereof and which further exhibits resilient, soft and yieldable opposing surface layers without exfoliating characteristics. In effect, low-pressure polyethylene plastic material is tantamount to a core of stiff, rigid and strong material or backing having linings or surface layers of soft, deformable high-pressure polyethylene material.

The cover or closure generally indicated by numeral 11 and as shown in Figures 1, 2 and 4 comprises a depressed central wall 12 joined to a raised and inverted groove type of rim having a top wall 13, a side wall 14, and a groove top wall 13 being joined to central wall 12 by an outwardly inclined and upwardly extending peripheral wall portion 15.

Grooved rim side wall 14 on the inner face is provided with oppositely flared upper and lower portions 16 and 17 forming an intermediate thickened section 18. The inner face of portion 16 adjacent the under surface of rim top wall 13 is preferably rounded, as at 16a as shown in Figure 2, to accommodate for hermetical sealing therewith an outwardly flared container lip portion 19 and rounded edge 20 thereof. It is understood that the inner diameter along upper portion 16 of the inner face of side wall 14 is somewhat smaller in diameter than the corresponding outer diametric portions of the container lip portion 19.

By reason of the structure described, closure 11 is enabled to be forceably fitted over rim 20 of the container and snap in place by progressive engagement of the inner face of wall 14 and the surface of container lip 20. The removal of closure 11 from container 10 is expedited by the spacing 21 afforded between the flaring of the inner face of wall 17 and the outer face of the side wall of container 10. By inserting the thumb in spacing 21 and by exerting outward and upward pressure, the cover 11 is easily removed. The removal is further expedited by the hinge effect of rounded rim portion 16a with respect to wall 14 of the inverted and grooved rim, such structure also furnishing the ease with which the cover 11 is snapped on to the container 10.

As stated, an important feature of the invention resides in the nature of the surface layers 22 and 23 of container 10, if molded of low-pressure polyethylene and in the opposite surface layers 24 and 25 of the cover 11 molded of low-pressure polyethylene. It appears that in molding products from low-pressure polyethylene whether by injection, blow, vacuum or other type, a phenomenon of molecular orientation takes place creating surface properties differing in yieldability and softness from the internal, intermediate or core structure as above mentioned. Any such surface layer when in contact for hermetical sealing as in the joint shown in Figure 2 serves effectually as a gasket element against opposing and underlying relatively stiff and rigid parts thereby making possible increased efficiency in hermetical sealing and increased efficiency in application and removal of the parts of the joint.

It is preferable that cover 11 be formed of low-pressure polyethylene if there is to be a choice in selection of different materials as between container or receptacle 10 and cover 11. However, both may be formed of low-pressure polyethylene. Moreover, it is not essential that the parts throughout the thickness thereof be of low-pressure polyethylene; a molded or heat applied or surface layer or lamination of low-pressure polyethylene along selected areas of the joint is also feasible.

In Figure 3 is shown a container and cover similarly operable and having similar features as in the embodiment shown in Figures 1 and 2.

Thus, a receptacle or container 26 is shown having a straight lip 27, the container opposite surfaces being indicated by numerals 28 and 29. The cover member generally indicated by numeral 30 has a central wall 31 and a raised and inverted peripheral groove having an inner wall 32, outer wall 33, top connecting wall 34 and an outwardly extending flange 35 proceeding from the bottom of outer wall 33. The cover opposite surfaces are indicated by numerals 36 and 37. Flange 35 is used for finger engagement for application and removal of cover 30. For removal, upward pressure is borne on the underside to outwardly flex wall 33 for disengagement with the lip 27 at the outer face to initiate removal.

As shown in Figure 3, the inner faces of the inverted groove walls 32, 34 and 33 engage the opposite faces of lip 27 of the container 26 for hermetical sealing. When all the contacting surfaces of the joint are of low-pressure polyethylene, there is the effect of a double gasket. This is also true of the embodiment of the invention shown in Figures 1 and 2. When only one of the contacting surfaces of the joint is of low-pressure polyethylene, there is the effect of a single gasket.

Thus, the invention essentially embraces a removable hermetical sealing joint between two removably engageable members such as a container and cover wherein a low-pressure polyethylene bearing face area is provided either as a lamination or as the surface afforded by the molded material itself. Moreover, the invention in addition to being capable of embodiment in a container and removable cover joint is further capable of being embodied in piping, bottles, couplings and other tubular or non-tubular members requiring removable caps or parts whether of the friction engaging type, screw-engaging type or other types.

I wish it understood that minor changes and variations in the material, location, integration, shape, size of parts and types of molding thereof may all be resorted to without departing from the spirit of the invention and the scope of the appended claims.

I claim:

1. In combination, a pair of open-mouthed relatively stiff engageable hollow members, one of said members at the mouth having a peripheral edge and the other of said members at the mouth having a peripheral rim to removably and frictionally engage said edge, the member with the peripheral rim having the bearing surface area intermediate said edge and rim integrally formed of low-pressure polyethylene to provide an effective gasketing means between said edge and rim.

2. In combination, a pair of open-mouthed relatively stiff engageable hollow members, one of said members at the mouth having a peripheral edge, the other of said members having at the mouth a rim to removably and frictionally engage said edge, said second mentioned member being molded of low-pressure polyethylene whereby the inner bearing surface of said rim against said peripheral edge serves as an effective gasket for hermetical sealing.

3. In combination, an open-mouthed rigid hollow-member having a free peripheral edge, a substantially rigid cover member therefor having an upper wall and a peripheral and raised and inverted grooved rim for removable and frictional engagement with said peripheral edge, said cover member being formed of molded low-pressure polyethylene to afford a deformable and resilient bearing surface between said edge and rim for hermetical sealing therebetween.

4. In combination, a rigid open-mouthed container having a free peripheral edge, a substantially rigid cover member therefor having an upper wall and a raised peripheral rim member including an inner wall, an outer wall, and a connecting top wall, the outer wall having an offset portion, the groove between said inner and outer walls serving to removably and frictionally engage said free peripheral edge, and the said offset portion serving as a finger gripping means for engagement and removal of the cover member, said cover member being formed of low-pressure polyethylene to afford deformable and resilient surface areas at parts in engagement with said container.

5. In combination, a substantially rigid open-mouthed container having a free peripheral edge, a substantially rigid cover member therefor having an upper wall and a raised peripheral rim member including an inner wall, an outer wall, and a connecting top wall, the outer wall having an offset portion, the groove between said inner and outer walls serving to removably and frictionally engage said free peripheral edge, and the said offset portion serving as a finger gripping means for engagement and removal of the cover member, said cover member and container both being formed of low-pressure polyethylene to afford deformable and resilient surface areas at parts in engagement with said container.

6. In combination, a pair of open-mouthed relatively stiff engageable hollow members, one of said members at the mouth having a peripheral edge, the other of said members having at the mouth a rim to removably and frictionally engage said edge, said second mentioned member being a mold of a homogeneous relatively stiff plastic, said mold exhibiting deformable surface characteristics whereby the inner bearing surface of said rim against said peripheral edge serves as an effective gasket for hermetical sealing.

7. In combination, a substantially rigid open-mouthed container having a peripheral and tapering side wall portion leading to the peripheral free edge of the container, a substantially rigid cover member therefor having an upper wall and a raised peripheral rim including an inner wall, an outer wall and a top connecting wall, the inner wall having smaller outer diametric dimensions than the inner face of said tapering side wall portion of the container, the outer wall along the inner face having oppositely tapered contours therealong to form an intermediate peripheral ring, the upper tapered contour portion and therealong having smaller diametric dimensions than the corresponding diametric dimensions of the outer face of the said tapering side wall portion and being adapted to snap into place therewith when the rim of the cover member is forced progressively along the circumference thereof over the container peripheral free edge whereby sealing is effected at the inner faces of the outer and top connecting walls of the rim against respectively the tapering side wall portion on the outer face and the free peripheral edge of the container, said cover member and container being of materials at least one of which is of a homogeneous and substantially rigid plastic exhibiting deformable surface characteristics whereby the said surface at the sealing areas serves as an effective gasket for hermetical sealing.

References Cited in the file of this patent

UNITED STATES PATENTS

| | | |
|---|---|---|
| 2,606,586 | Hill | Aug. 12, 1952 |
| 2,614,727 | Robinson | Oct. 21, 1952 |
| 2,740,444 | Martinelli | Apr. 3, 1956 |